United States Patent
Meng et al.

(10) Patent No.: US 12,380,285 B2
(45) Date of Patent: Aug. 5, 2025

(54) GROUNDED DIALOGUE GENERATION WITH CROSS-ENCODING RE-RANKER, GROUNDING SPAN PREDICTION, AND PASSAGE DROPOUT

(71) Applicant: Centre for Perceptual and Interactive Intelligence (CPII) Limited, Hong Kong (CN)

(72) Inventors: Mei Ling Helen Meng, Hong Kong (CN); Xixin Wu, Hong Kong (CN); Kun Li, Hong Kong (CN); Tianhua Zhang, Hong Kong (CN); Liping Tang, Hong Kong (CN); Junan Li, Hong Kong (CN); Hongyuan Lu, Shanghai (CN)

(73) Assignee: Centre for Perceptual and Interactive Intelligence (CPII) Limited, Hong Kong (CN)

( * ) Notice: Subject to any disclaimer, the term of this patent is extended or adjusted under 35 U.S.C. 154(b) by 408 days.

(21) Appl. No.: 17/900,806

(22) Filed: Aug. 31, 2022

(65) Prior Publication Data
US 2024/0070403 A1 Feb. 29, 2024

(51) Int. Cl.
*G06F 40/51* (2020.01)
*G06F 16/3329* (2025.01)

(52) U.S. Cl.
CPC .......... *G06F 40/51* (2020.01); *G06F 16/3329* (2019.01)

(58) Field of Classification Search
None
See application file for complete search history.

(56) References Cited

U.S. PATENT DOCUMENTS

| | | | |
|---|---|---|---|
| 11,803,401 B1 * | 10/2023 | Ferrucci | G06F 9/453 |
| 12,106,056 B2 * | 10/2024 | Lam | G06F 40/35 |
| 2022/0277135 A1 * | 9/2022 | Kryscinski | G06F 16/345 |
| 2022/0374459 A1 * | 11/2022 | Liu | G06F 16/337 |
| 2022/0383159 A1 * | 12/2022 | Yavuz | G06N 3/0455 |
| 2022/0398384 A1 * | 12/2022 | Wang | G06F 40/30 |
| 2023/0119109 A1 * | 4/2023 | Choubey | G06F 18/2155 |
| | | | 706/12 |
| 2023/0267126 A1 * | 8/2023 | Frieder | G06F 16/3349 |
| | | | 707/748 |
| 2023/0267267 A1 * | 8/2023 | Sukla | G06F 40/131 |
| | | | 706/46 |
| 2023/0367965 A1 * | 11/2023 | Hoshi | G06F 16/3347 |
| 2023/0418868 A1 * | 12/2023 | Seonwoo | G06F 16/313 |

(Continued)

OTHER PUBLICATIONS

Leonhardt (Leonhardt J, Beringer F, Anand A. Exploiting Sentence-Level Representations for Passage Ranking. arXiv preprint arXiv:2106.07316. Jun. 14, 2021.) (Year: 2021).*

(Continued)

*Primary Examiner* — Jonathan C Kim
(74) *Attorney, Agent, or Firm* — Kilpatrick Townsend & Stockton LLP

(57) ABSTRACT

An information-seeking dialogue system can be trained using a pipeline process having stages, or components, of passage retrieval (selecting passages relevant to a query from a corpus or knowledge base), re-ranking, and generating a response to the query based on one or more of the re-ranked passages. Each stage, or component, of the pipeline can be individually optimized based on ground truth data.

21 Claims, 6 Drawing Sheets

(56) References Cited

U.S. PATENT DOCUMENTS

2024/0070403 A1* 2/2024 Meng .................. G06F 40/51

OTHER PUBLICATIONS

Feng (Feng S, Patel SS, Wan H, Joshi S. MultiDoc2Dial: Modeling dialogues grounded in multiple documents. arXiv preprint arXiv:2109.12595. Sep. 26, 2021.) (Year: 2021).*

Liang (Wu L, Li J, Wang Y, Meng Q, Qin T, Chen W, Zhang M, Liu TY. R-drop: Regularized dropout for neural networks. Advances in Neural Information Processing Systems. Dec. 6, 2021;34:10890-905.) (Year: 2021).*

Pranesh RR, Shekhar A, Pallavi S. Quesbelm: A bert based ensemble language model for natural questions. In2020 5th International Conference on Computing, Communication and Security (ICCCS) Oct. 14, 2020 (pp. 1-5). IEEE. (Year: 2020).*

Baradaran R, Amirkhani H. Zero-shot estimation of base models' weights in ensemble of machine reading comprehension systems for robust generalization. In2021 26th International Computer Conference, Computer Society of Iran (CSICC) Mar. 3, 2021 (pp. 1-5). IEEE. (Year: 2021).*

Gao L, Dai Z, Callan J. Rethink training of BERT rerankers in multi-stage retrieval pipline. InAdvances in Information Retrieval: 43rd European Conference on IR Research, ECIR 2021, Virtual Event, Mar. 28,-Apr. 1, 2021, Proceedings, Part II 43 2021 (pp. 280-286). Springer International Publishing. (Year: 2021).*

Choi, et al., "Quac: Question answering in context," Proceedings of the 2018 Conference on Empirical Methods in Natural Language Processing, Brussels, Belgium, pp. 2174-2184, Association for Computational Linguistics (Oct. 31,-Nov. 4, 2018).

Clark, et al., Electra: Pre-training text encoders as discriminators rather than generators, Published as a conference paper at ICLR 2020, 18 pages (2020).

Devlin, et al., "BERT: Pre-training of deep bidirectional transformers for language understanding," Proceedings of the 2019 Conference of the North American Chapter of the Association for Computational Linguistics: Human Language Technologies, vol. 1 (Long and Short Papers), pp. 4171-4186, Minneapolis, Minnesota. Association for Computational Linguistics (2019).

Feng, et al., "MultiDoc2Dial: Modeling dialogues grounded in multiple documents," Proceedings of the 2021 Conference on Empirical Methods in Natural Language Processing, pp. 6162-6176, Online and Punta Cana, Dominican Republic. Association for Computational Linguistics (2021).

Gao, et al., "Rethink training of BERT rerankers in multi-stage retrieval pipeline," Advances in Information Retrieval—43rd European Conference on IR Research, ECIR 2021, Virtual Event, Mar. 28,-Apr. 1, 2021, Proceedings, Part II, vol. 12657 of Lecture Notes in Computer Science, pp. 280-286. Springer (2021).

Guu, et al., "REALM: retrieval augmented language model pre-training," CoRR, abs/2002.08909, 10 pages (2020).

Izacard, et al., "Leveraging passage retrieval with generative models for open domain question answering," Proceedings of the 16th Conference of the European Chapter of the Association for Computational Linguistics: Main vol. EACL 2021, Online, Apr. 19-23, 2021, pp. 874-880, Association for Computational Linguistics (2021).

Karpukhin, et al., "Dense passage retrieval for opendomain question answering," Proceedings of the 2020 Conference on Empirical Methods in Natural Language Processing (EMNLP), pp. 6769-6781, Online. Association for Computational Linguistics (2020).

Lee, et al., "Latent retrieval for weakly supervised open domain question answering," CoRR, abs/1906.00300, 11 pages (2019).

Lewis, et al., "Retrieval-augmented generation for knowledge-intensive NLP tasks," Advances in Neural Information Processing Systems 33: Annual Conference on Neural Information Processing Systems 2020, NeurIPS 2020, Dec. 6-12, 2020, virtual (2020).

Liu, et al., "RoBERTa: A Robustly Optimized BERT Pretraining Approach," arXiv e-prints, arXiv:1907.11692, 13 pages (2019).

Reddy, et al., "CoQa: A conversational question answering challenge," Trans. Assoc. Comput. Linguistics, vol. 7, pp. 249-266 (2019).

Saeidi, et al., "Interpretation of natural language rules in conversational machine reading," Proceedings of the 2018 Conference on Empirical Methods in Natural Language Processing, Brussels, Belgium, Oct. 31,-Nov. 4, 2018, pp. 2087-2097. Association for Computational Linguistics (2018).

Wolf, et al., "Transformers: State-of-the-art natural language processing," CoRR, abs/1910.03771, 8 pages (2019).

Li, et al., "Grounded Dialogue Generation with Cross-encoding Re-ranker, Grounding Span Prediction, and Passage Dropout," Proceedings of the Second DialDoc Workshop on Document-grounded Dialogue and Conversational Question Answering, pp. 123-129, Association for Computational Linguistics (2022).

* cited by examiner

| Split | Setting | Instance Num | Passage Num |
|---|---|---|---|
| Train | seen | 21451 | 3820 |
| Validation | seen | 4201 | 3820 |
| | unseen | 121 | 963 |
| Development | seen | 199 | 3820 |
| | unseen | 417 | 963 |
| Test | seen | 661 | 3820 |
| | unseen | 126 | 963 |

FIG. 3

|  | Val | | | | | | Dev | | | | | | Test | | | | | |
|---|---|---|---|---|---|---|---|---|---|---|---|---|---|---|---|---|---|---|
| seen | F1 | S-BLEU | ROUGE | F1 | S-BLEU | ROUGE | F1 | S-BLEU | ROUGE | F1 | S-BLEU | ROUGE | F1 | S-BLEU | ROUGE | F1 | S-BLEU | ROUGE |
| RAG | 36.64 | 23.24 | 35.23 | 36.23* | 21.41* | 34.01* | 35.85* | 22.26* | 33.82* |
| Ours | 47.29 | 34.29 | 46.04 | 50.14 | 34.99 | 47.91 | 52.06 | 37.41 | 50.19 |
| unseen | F1 | S-BLEU | ROUGE | F1 | S-BLEU | ROUGE | F1 | S-BLEU | ROUGE |
| RAG | 13.68 | 4.46 | 13.19 | 18.66* | 5.99* | 16.95* | 19.26* | 6.32* | 17.16* |
| Ours | 36.74 | 24.20 | 35.49 | 36.39 | 26.33 | 34.71 | 34.65 | 27.57 | 34.49 |

FIG. 4

| Method | seen | | | unseen | | |
|---|---|---|---|---|---|---|
| | MRR@5 | R@1 | R@5 | MRR@5 | R@1 | R@5 |
| Official DPR* | 0.487 | 0.379 | 0.656 | 0.277 | 0.207 | 0.405 |
| Reproduced DPR | 0.548 | 0.445 | 0.714 | 0.328 | 0.248 | 0.471 |
| BERT $B$ | 0.719 | 0.643 | 0.834 | 0.615 | 0.529 | 0.752 |
| ELECTRA $E$ | 0.719 | 0.640 | 0.837 | 0.582 | 0.521 | 0.694 |
| RoBERTa $R$ | 0.748 | 0.683 | 0.849 | 0.641 | 0.562 | 0.760 |
| $\mathcal{E}(B, R)$ | 0.754 | 0.689 | 0.855 | 0.664 | 0.603 | 0.769 |
| $\mathcal{E}(E, R)$ | 0.756 | 0.689 | 0.858 | 0.643 | 0.595 | 0.719 |
| $\mathcal{E}(B, E, R)$ | 0.760 | 0.696 | 0.858 | 0.666 | 0.620 | 0.744 |

FIG. 5

| Method | seen | | | unseen | | |
|---|---|---|---|---|---|---|
| | F1 | EM | S-BLEU | F1 | EM | S-BLEU |
| BART in the RAG | 43.77 | 6.36 | 30.91 | 31.92 | 2.48 | 21.25 |
| BART | 45.91 | 7.02 | 32.36 | 32.93 | 2.48 | 20.73 |
| + multi-task training | 46.51 | 6.67 | 32.90 | 33.61 | 2.48 | 21.37 |
| + passage dropout | 47.05 | 7.38 | 32.82 | 34.27 | 4.13 | 21.94 |
| + regularization | 47.29 | 7.31 | 34.29 | 36.74 | 4.96 | 24.20 |

FIG. 6

GROUNDED DIALOGUE GENERATION WITH CROSS-ENCODING RE-RANKER, GROUNDING SPAN PREDICTION, AND PASSAGE DROPOUT

BACKGROUND

This disclosure relates generally to information-seeking dialogue systems and in particular to systems and methods for grounded dialogue generation with cross-encoding re-ranker, grounding span prediction, and passage dropout.

Information-seeking dialogue systems are computer-based systems that attempt to aid a user in retrieving relevant information through an iterative process using natural language. The user (generally a human being) presents an initial query, receives a response from the dialogue system, then makes a next query based on or informed by the response. The process can continue until the user has obtained the desired information. Dialogue systems are typically trained by applying machine-learning algorithms to passages extracted from one or more documents. At a high level, the goal of such systems is to answer users' questions, with answers grounded in documents, in a conversational manner.

The task of developing information-seeking dialogue systems has seen many recent research advancements, but much room for improvement remains. MultiDoc2Dial (described at https://doc2dial.github.io/multidoc2dial/) is a realistic task proposed by Feng et al. (2021) to model goal-oriented information-seeking dialogues that are grounded on multiple documents, and participants are required to generate appropriate responses to users' utterances according to the documents. To facilitate this task, the MultiDoc2Dial authors also propose a new dataset that contains dialogues grounded in multiple documents from four domains. Unlike previous work that primarily focused on document-grounded dialogue modeling as a machine reading comprehension task based on one particular document or passage, the MultiDoc2Dial allows multiple topics within a conversation, hence it is grounded in different documents. MultiDoc2Dial is an example of a task that poses numerous challenges.

SUMMARY

Certain embodiments of the present invention relate to systems and methods for training and using information-seeking dialogue systems. According to some embodiments, the training can be performed in a pipeline process having stages, or components, of passage retrieval (selecting passages relevant to a query from a corpus or knowledge base), re-ranking, and generating a response to the query based on one or more of the re-ranked passages. Each stage can be individually optimized using the ground truth of training data. Once trained, the system can be used to respond to user queries in a conversational manner.

Some embodiments relate to methods for responding to user queries that can be implemented in computer systems, for instance by programming a processor to execute appropriate instructions. Such instructions may be stored in computer-readable storage media and read by a processor to implement the method. In various embodiments, a method can include: obtaining a training set, the training set including a plurality of passages, a plurality of queries, and a plurality of responses, the training set further including association data associating particular queries of the plurality of queries with particular passages of the plurality of passages and particular responses of the plurality of responses. A training process can be performed using the training set, and the training process can include: training a retriever model to identify similarities between a query and a passage; training a re-ranking model to rank a plurality of passages based on a distance metric defining a distance between a passage and a query; and training a generator model to generate a response to a query based on a passage. A testing process can be performed using the trained models, and the testing process can include: receiving a testing query; using the retriever model to retrieve a plurality of passages responsive to the testing query; using the re-ranking model to rank the retrieved passages based on the testing query; and using the generator model to generate a response based on a highest-ranking one of the retrieved passages.

Various models can be used. In some embodiments, the retriever model can be a Dense Passage Retriever (DPR) model having a first encoder for a query and a second encoder for a passage. The retriever model can define similarity based on a dot product of an encoding of the query using the first encoder and an encoding of the passage using the second encoder. In these and other embodiments, the re-ranking model can use an ensemble of transformer language models (including, e.g., at least two or at least three transformer language models) that each output a distance function between a passage and a query, and the re-ranking model can rank the plurality of passages based on a weighted sum of the distance functions of the transformer language models. In these and other embodiments, training the re-ranking model can include training one or more weights for the weighted sum.

In these and other embodiments, training the generator model can include training grounding span prediction as an auxiliary task.

In these and other embodiments, training the generator model can include applying passage dropout.

In these and other embodiments, each query in the training set can include a query history, and the testing query can also include a query history.

The following detailed description, together with the accompanying drawings, will provide a better understanding of the nature and advantages of the claimed invention.

BRIEF DESCRIPTION OF THE DRAWINGS

FIG. 3 is a table 4 showing the statistics of dataset in different splits according to some embodiments.

FIGS. 4-6 are tables showing results obtained according to an example embodiment.

DETAILED DESCRIPTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

1. Overview

Figure 1:
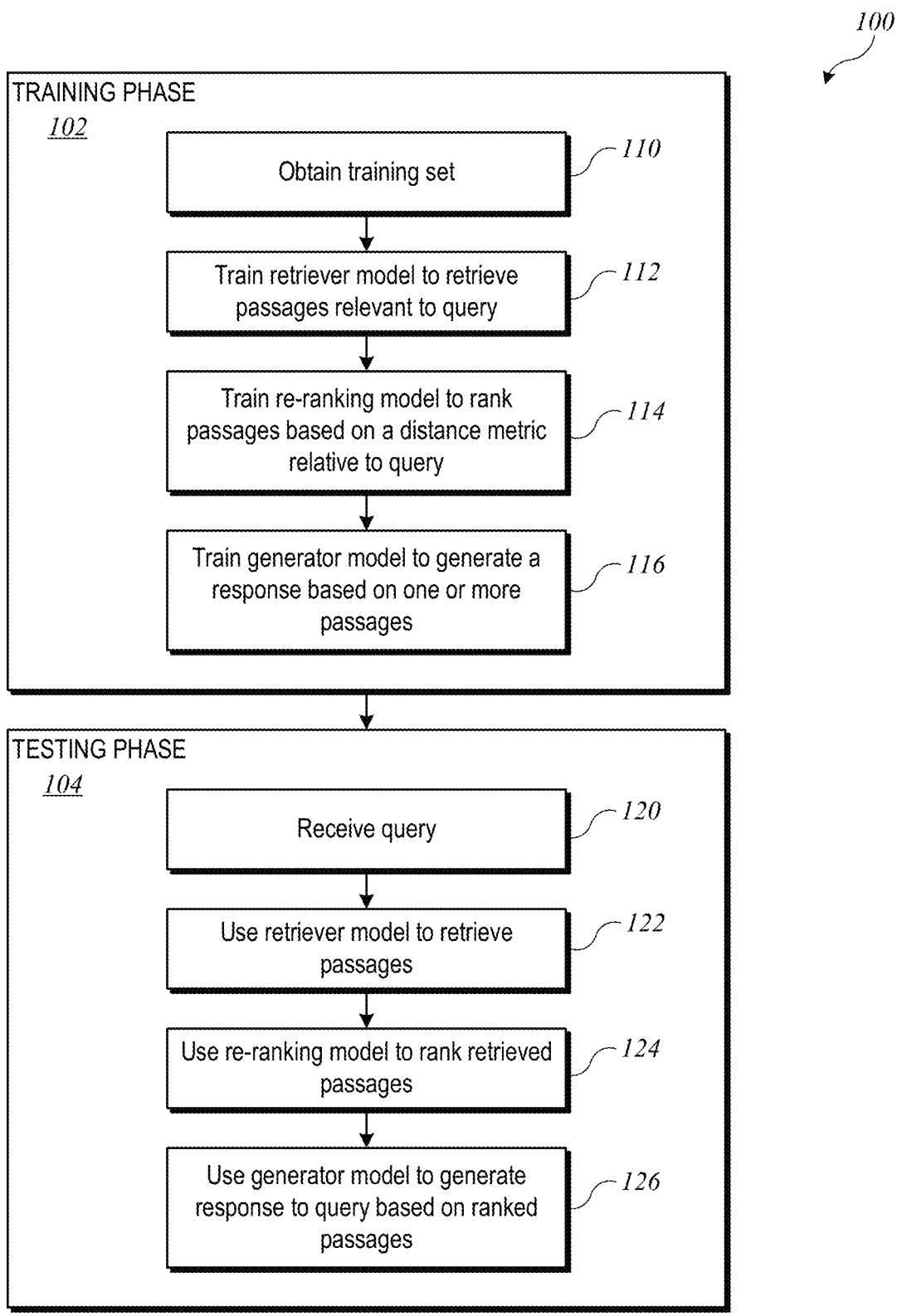
FIG. 1 shows a flow diagram of a process 100 according to some embodiments.

FIG. 1 shows a flow diagram of a process 100 according to some embodiments. Process 100 can be a computer-implemented process and can include two phases: a training phase 102 and a testing phase 104. During training phase 102, machine-learning models are trained to perform the tasks of retrieving passages relevant to a query, re-ranking the retrieved passages, and generating a response based at least in part on a passage and a query. The machine-learning models can be deep learning models such as deep neural networks or other suitable models.

In the training phase 102, at block 110, a training set of training data is obtained. The training set can include examples of queries, passages, and responses. For example, the training set can include passages (documents or other segments of text, which can be marked up using HTML, or other markup languages), queries (e.g., questions a user seeking information might pose), and responses. Associations can be defined between a query, a passage, and a response, and these associations may serve as ground truth during training. As with machine learning in general, the learning can be supervised; for instance, human editors can define query/passage/response associations for the training set. Training of the models can be based on conventional machine-learning processes. For instance, training can include defining a loss function that is to be minimized by adjusting parameters of the model.

At block 112, a retriever model is trained to identify similarities between a query and a passage. For instance, the query and the passage can be encoded using vector encoding schemes, examples of which are known in the art. In some embodiments, the retriever model can include a ranking of pages based on similarity to the query. At block 114, a re-ranking model is trained to rank passages that have been identified as relevant to a query. In some embodiments, the ranking can be based at least in part on a distance metric defining a distance between a passage and a query, and the ranking by the re-ranking module can be independent of any ranking generated by the retriever model. At block 116, a generator model is trained to generate a response to a query based on a passage. In some embodiments, training phase 102 can be pipelined, with each model (retriever, re-ranking, and generator) being individually optimized to make maximum use of the supervision. Example implementations of training processes and metrics are described below. The same training data set can be used to train all three models.

Referring again to FIG. 1, the testing phase 104 can be performed after at least some training has occurred. "Testing," as used herein, can include testing that may occur during training as well as post-training deployment of the system to respond to actual user queries. During testing, at block 120, a testing query can be received. At block 122, the retriever model can be used to retrieve a number of passages responsive to the testing query (e.g., top K passages, for some number K). At block 124, the re-ranking model can be used to re-rank the retrieved passages based on the testing query. It should be noted that, while the retriever model may also perform ranking to select the top-K passages the re-ranking model is separately optimized and may produce a different ranking of the passages. At block 126, the generator model can be used to generate a response based on a highest-ranking one or more of the re-ranked passages. In some embodiments, all K passages returned by the re-ranking module can be used by the generator model. Alternatively, the passages can be filtered based on their re-ranking scores, and fewer than K passages may be used. For instance, lower-ranking passages may be ignored if a significant score gap exists between the highest-ranked passage and one or more of the other K passages. After filtering, the highest-ranking passages can be concatenated into a single passage, to which the generator model is applied to generate a response to the testing query. This response can be presented to a user. The response may prompt a subsequent query, which can also be processed according to blocks 120-126.

Process 100 is illustrative, and variations and modifications are possible. Particular training algorithms, training sets, and document sets can be chosen as desired. Specific example implementations of various blocks of process 100 are described below.

In some embodiments, process 100 can be used to generate responses in the context of information-seeking dialogue. Accordingly, a "query" as used herein is not limited to a single query and may include a query history, such as sequence of queries posed by a user.

"Passages" can include any text used to generate responses to queries, and passages can be extracted from any source. Each passage can be as long or short as desired, and passages may include one or more sentences. In some embodiments, the text can be provided in a markup language such as HTML, and any markup tags that may be present can be treated as part of a passage, or markup tags can be used to separate a text into passages. Collectively, the passages can represent the knowledge base of the system and may define the scope of information that the system is capable of providing.

A "response" can include words or sentences output by the system in response to a query. Depending on implementation, the response can include an excerpt from a passage, an entire passage, or a response constructed using portions of one or more passages. The overarching goal of process 100 is to provide responses that are relevant to the query. A relevant response to a query generally includes information that was actually requested. Minimizing extraneous information may also be an aspect of the goal.

In some embodiments, the re-ranking model can be based on an ensemble of transformer language models that each output a distance function between a passage and a query. Examples of transformer language models include BERT (Devlin et al., 2019), RoBERTa (Liu et al., 2019), and ELECTRA (Clark et al., 2020). The re-ranking can be based on a weighted sum of the distance functions of the transformer language models in the ensemble, and the weights can be optimized during training of the re-ranking model.

Figure 2:
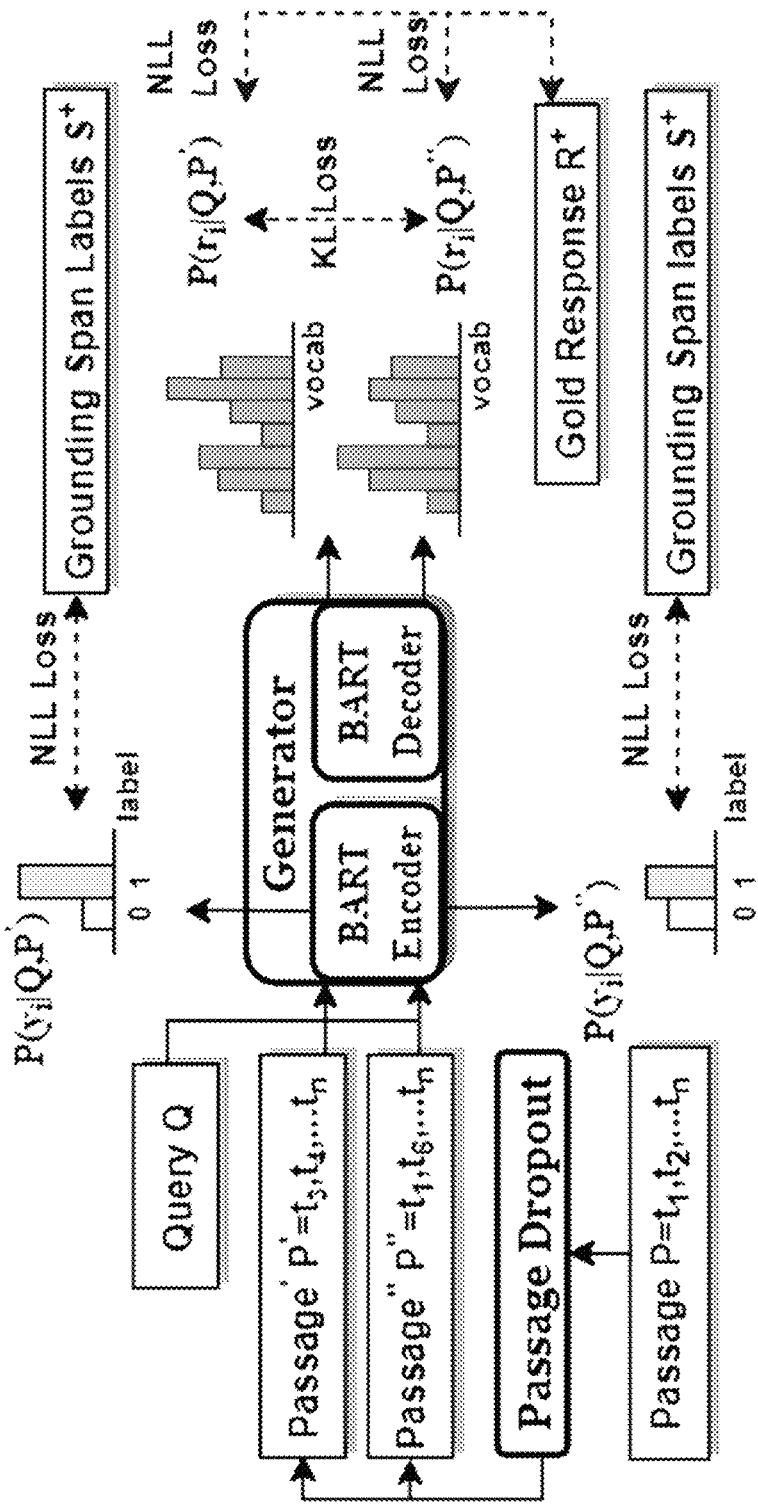
FIG. 2 shows a block diagram further illustrating training of a generator model with grounding span prediction and passage dropout according to some embodiments.

In some embodiments, response generation can incorporate grounding span prediction. For example, grounding span prediction can be treated as an auxiliary task that is trained during training of the generator model; multi-task training techniques can be used. In addition, passage dropout techniques can be employed to enhance robustness of the generator model. FIG. 2 shows a block diagram further illustrating training of a generator model with grounding span prediction and passage dropout according to some embodiments.

Some embodiments described herein provide information-seeking dialog systems and methods that incorporate some or all of the following features:

(1) In order to fully leverage the ground-truth training data, the retriever, re-ranker, and response generator are individually optimized.

(2) A deep cross-encoded re-ranker is adopted and trained with localized hard negatives sampled from the retriever results.

(3) Grounding span prediction is used as an auxiliary task for the generator, and passage dropout is used as a regularization technique to improve the generator performance.

Described below are example embodiments of a pipeline system of "retrieve, re-rank, and generate" for the MultiDoc2Dial challenge, incorporating features of process 100. An advantage of pipelined training is that each of the three components of the pipeline can fully exploit the ground-truth training data. In these examples, a deep cross-encoder architecture is employed in which a training set is created using localized hard negatives sampled from the retriever results. Grounding span prediction is adopted as an auxiliary task to be jointly trained with the response generator. Passage dropout and regularization are also applied to improve response generation performance. Experimental results, some of which are summarized below, indicate that systems and methods incorporating such features can achieve a performance with marked improvement over the strong baseline for the MultiDoc2Dial challenge. One implementation achieved first place on the seen test and second place on the unseen test of the challenge.

2. Related Work

Open-domain Question Answering systems have evolved to adopt the popular "Retriever-Reader (Generator)" architecture since DrQA (Chen et al., 2017). Previous work (Lee et al., 2019; Guu et al., 2020) adopted an end-to-end training strategy to jointly learn the retriever and reader with question-answer pairs. Retrieval-augmented Generation (RAG) (Lewis et al., 2020b) uses Dense Passage Retriever (DPR) (Karpukhin et al., 2020) as the retriever to extract multiple documents related to the query and feed them into a BART (Lewis et al., 2020a) generator for answer generation. Izacard and Grave (2021) proposed the Fusion-in-Decoder method that processes passages individually in the encoder but jointly in the decoder, surpassing the performance of RAG.

Other work, such as QuAC (Choi et al., 2018), ShARC (Saeidi et al., 2018) and CoQA (Reddy et al., 2019), has focused on the machine reading comprehension task, which assumes that the associated document is given. In particular, Feng et al. (2020) proposed the Doc2Dial task, which aims to extract the related span from the given documents for generating the corresponding answer.

3. Task Description

The MultiDoc2Dial task aims to generate an appropriate response $\mathcal{R}$ based on an input query $Q$ (the current user turn $u_T$ and the concatenated dialogue history $\{u_1^{T-1}\}:=u_1, u_2, \ldots, u_{T-1}$) and a collection of passages $\{\mathcal{P}_i\}_{i=1}^M$. The passages can be extracted from documents based on document structural information indicated by markup tags in the original HTML file. The organizer has split the MultiDoc2Dial data into train, validation, development and test set, and for purposes of the challenge, results on the latter two are evaluated through a leaderboard (available at https://eval.ai/web/challenges/challenge-page/1437/leaderboard). The validation, development and test sets contain two settings: seen and unseen, which are categorized based on whether there are dialogues grounded on the documents seen/unseen during training.

More specifically, MultiDoc2Dial contains 4796 conversations with an average of 14 turns grounded in 488 documents from four domains. After splitting, the number of passages in the seen set is M=4110 for the official data pre-processing and M=3820 for our processed data to remove duplicate passages. Similarly, the number of passages in the unseen set is M=963. FIG. 3 is a table 4 showing the statistics of dataset in different splits according to some embodiments. In examples herein, a single conversation is split into multiple instances of the train and validation set.

4. Methodology

We implemented an embodiment of a pipeline system of "retrieve, re-rank, and generate" in the context of the MultiDoc2Dial challenge. Following previous work in Lewis et al. (2020b); Feng et al. (2021), we adopted DPR (Karpukhin et al., 2020) as the retriever (described in § 4.1) to efficiently filter out irrelevant passages and narrow the search space. We then refined the retrieval results with a deep cross-encoder (described in § 4.2) trained with localized negatives (Gao et al., 2021). We introduced a passage dropout and regularization technique to enhance the robustness of the generator (described in § 4.3) and used the grounding span prediction as an auxiliary task. Furthermore, pipeline training was adopted where each component was individually optimized to fully utilize the supervision. Experimental results (described in § 5) illustrate the effectiveness and merits of the approach described herein.

4.1. Passage Retrieval

Following Feng et al. (2021), we adopted DPR (Karpukhin et al., 2020) as the retriever with a representation-based bi-encoder, that is, a dialogue query encoder q(•) and a passage context encoder p(•). Given an input query $Q$ and a collection of passages $\{\mathcal{P}_i\}_{i=1}^M$, we extracted the query encoding as q($Q$) and the passage encoding as p($\mathcal{P}_i$). The similarity was defined as the dot product of the two vectors $Qq(\ )\cdot p(\mathcal{P}_i)$, and the model was trained to optimize the negative log likelihood of the positive passage among L in-batch and hard negatives. We then pre-computed the representations of all passages and indexed them offline. Maximum Inner Product Search (MIPS) with Faiss (Johnson et al., 2017) was adopted to retrieve the top-K passages during inference.

4.2. Passage Re-Ranking

To re-rank the passages retrieved by DPR, we used a BERT-based cross-encoder that exploits localized negatives sampled from DPR results (Gao et al., 2021). This means that the construction of the training set for the re-ranker was based on the top negative passages retrieved by the DPR. Specifically, given a query $Q$, its corresponding ground truth passage P⁺, and its top-N negative passages $\{\mathcal{P}_j^-\}_{j=1}^N$ retrieved by DPR, we first calculated a deep distance function for each positive and negative passage against the query:

$$\text{dist}(Q, \mathcal{P}) = v^T cls(\text{BERT}(\text{concat}(Q, \mathcal{P}))), \quad (1)$$

where $v^T$ represents a trainable vector, and cls(•) is a function that extracts the [CLS] vector from BERT. Consequently, such a distance function is deeply cross-encoded, as we fed the concatenation of the query and the passage into the model instead of encoding them individually with a representation-based bi-encoder (Feng et al., 2021). We then applied a contrastive loss:

$$\mathcal{L}_c = -\log \frac{\exp(dist(Q, \mathcal{P}^+))}{\sum_{P \in \mathcal{P}_\pm} \exp(dist(Q, \mathcal{P}))}, \quad (2)$$

where $\mathcal{P}_\pm$ represents $\mathcal{P}^+ \cup \{\mathcal{P}_i^-\}_{i=1}^N$. Here, it is advantageous to condition the gradient on the negative passages to learn to recognize the positive passage from hard negatives retrieved by the DPR. (Feng et al. (2021) found that there exist passages that are similar to one another in the MultiDoc2Dial dataset. Therefore, it is intuitively important to distinguish these hard negative passages from the ground truth passage. Empirically, we also found that excluding hard negative passages from the training process hampers the re-ranking performance.)

Ensemble. We created an ensemble of three pre-trained models (Dietterich, 2000), namely, BERT (Devlin et al., 2019), RoBERTa (Liu et al., 2019), and ELECTRA (Clark et al., 2020) for re-ranking. We first calculated their distance function for each model with Eq. (1), with the output scores denoted as $\mathcal{O}_B$, $\mathcal{O}_R$, and $\mathcal{O}_E$. We defined the final scores $\mathcal{O}$ as the weighted summation of the above three scores:

$$\mathcal{O} = \alpha \mathcal{O}_B + \beta \mathcal{O}_R + \gamma \mathcal{O}_E, \quad (3)$$

where α, β, and γ represent the weight hyper-parameters for each model.

4.3. Response Generation

For response generation, we leveraged the pre-trained sequence-to-sequence model BART$_{large}$ (Lewis et al., 2020a), where the encoder is fed the concatenation of a query and a passage [$Q$, $\mathcal{P}$], and the decoder is then required to generate the corresponding response $\mathcal{R}$. We used the ground truth passage as $\mathcal{P}$ for training. The training process included the following aspects:

(1) Joint Training with Grounding Prediction. The grounding span in a passage is the supporting evidence for the response, which can provide helpful information for response generation. Therefore, we took grounding span prediction as the auxiliary task and applied multi-task learning for model training. Specifically, the passage was first encoded into a sequence of hidden representations $h_i$=Encoder([$Q$, $\mathcal{P}$]), $i \in \{1, \ldots, |\mathcal{P}|\}$. Then a classifier output the probability of the i-th token of $\mathcal{P}$ to lie within the grounding span as $P(y_i| Q, \mathcal{P})$=sigmoid(MLP($h_i$)). We defined this task's training objective as:

$$\mathcal{L}_G = -\sum_{i=1}^{|\mathcal{P}|} \log P(y_i | Q, \mathcal{P}). \quad (4)$$

(2) Passage Dropout and Regularization. Preliminary experiments indicated that the generator may overfit to some passages quoted frequently in the training set, which may cause generalization errors when applied to previously unseen passages. We applied passage dropout to enhance the robustness of the generator. More specifically, for a training sample ([$Q$, $\mathcal{P}$], $\mathcal{R}$), a consecutive span with a specified length (of 25% in our experiments) in $\mathcal{P}$ was randomly selected and then dropped, which produces $\mathcal{P}'$. Passage dropout advantageously avoids truncating content of grounding spans. For instance, if the selected span overlaps with a grounding span, this sampling is discarded and another span can be sampled. Furthermore, we repeated passage dropout twice for each sample in a batch, and obtain ([$Q$, $\mathcal{P}'$], $\mathcal{R}$) as well as ([$Q$, $\mathcal{P}''$], $\mathcal{R}$). Since the grounding span in a passage serves as the oracle for response generation, the two modified inputs should have similar prediction distribution, denoted as $P(r_i| Q, \mathcal{P}', r_{<i})$ and $P(r_i| Q, \mathcal{P}'', r_{<i})$, where $r_i$ is the i-th token of $\mathcal{R}$. Hence, inspired by Liang et al. (2021), we propose to regularize the predictions from different passage dropouts by minimizing the bidirectional Kullback-Leibler (KL) divergence between these two different output distributions as $\mathcal{L}_{KL}$, given by:

$$\sum_i (KL(P(r_i | Q, \mathcal{P}', r_{<i}) \| P(r_i | Q, \mathcal{P}'', r_{<i})) + \quad (5)$$

$$KL(P(r_i | Q, \mathcal{P}'', r_{<i}) \| P(r_i | Q, \mathcal{P}', r_{<i}))).$$

We defined the training objective for response $\mathcal{R}$ as the basic negative log likelihood:

$$\mathcal{L}_{NLL} = -\sum_i (\log P(r_i | Q, \mathcal{P}', r_{<i}) + \log P(r_i | Q, \mathcal{P}'', r_{<i})). \quad (6)$$

With passage dropout, the learning objective of grounding prediction (given in Eq. (4)) was updated for $\mathcal{P}'$ and $\mathcal{P}''$. Then we have the final training objective:

$$\mathcal{L} = \frac{1}{2} \mathcal{L}_{KL} + \mathcal{L}_{NLL} + \mathcal{L}_G. \quad (7)$$

4.4. Inference

During the inference phase, after the re-ranker returned the top-5 passages corresponding to the query $Q$, we filtered out the passages with a low re-ranking score (as given by Eq. (3)), namely, the ones that have a score gap of over 0.3 comparing to the top-1. Then the remaining passages were concatenated as a single passage $\mathcal{P}$. Finally, the generator predicted a response $\mathcal{R}$ given the input [$Q$, $\mathcal{P}$]. (Grounding Prediction and passage dropout were not implemented in the inference phrase.) We employ beam-search (beam width=5) during decoding.

4.5 Additional Implementation Details

Our implementations of DPR, BERT, RoBERTa, ELECTRA, and BART were based on the Transformers library (Wolf et al., 2019). All the models were trained on an RTX 3090 GPU with 24 GB VRAM.

Retriever. We trained the retriever on our pre-processed MultiDoc2Dial data with an effective batch size of 16 following Facebook DPR (Karpukhin et al., 2020), and the corresponding results are shown in table 2 (FIG. 5) named as Reproduced DPR. The Official DPR in table 2 was fine-tuned with a batch size 128 by the organizer.

Re-ranker. Three public pre-trained language models were ensembled, namely, deepset/bert-large-uncased-whole-word-masking-squad2 (see https://huggingface.co/deepset/bert-large-uncased-whole-word-masking-squad2), deepset/roberta-large-squad2 (https://huggingface.co/deepset/roberta-large-squad2), and deepset/electra-base-squad2 (9https://huggingface.co/deepset/electra-base-squad2). We trained the models with a batch size 1 for LARGE (gradient accumulation=4) and 4 for BASE. We used 6 epochs, a learning rate of 1e-5 and weight decay of 0.01. The maximum length of query, i.e., the concatenated dialogue history $\{u_1^{T-1}\}$ and the current user turn $u_T$ were set as 128. Following Feng et al. (2021), the query was constructed using reverse conversation order as $u^T[SEP]$ agent:$u^{T-1}$||user:$u^{T-2}$|| . . . ||user:$u^1$ and truncated from the tail by the tokenizers. The number of localized negatives in training was 7, sampled from Top-N (N=50) returned negative passages from retriever. During inference, re-ranker re-scored the Top-K (K=100) returned passage candidates from retriever and selected the Top-5 passages for generator.

5. Experiments and Results

We evaluated the passage retrieval results with recall (R) and mean reciprocal rank (MRR). We report response generation performance based on F1, Exact Match (EM) (Rajpurkar et al., 2016), SacreBLEU (S-BLEU; Post, 2018), and RougeL (Lin, 2004).

Results are summarized in the tables shown in FIGS. 4-6; further discussion is provided below.

FIG. 4 is a table 1 showing a comparison between a baseline framework and the framework described in § 4 on the validation, development, and test set. Scores marked with asterisk are cited from the MultiDoc2Dial leaderboard. "S-BLEU" represents SacreBLEU.

FIG. 5 is a table 2 showing retrieval performance on the MultiDoc2Dial validation set. All models are fine-tuned using the training set only. Asterisk indicates the model trained on the official pre-processed data; all other models are trained on our pre-processed version described herein. ε(•) denotes ensemble.

FIG. 6 is a table 3 showing results of ablation analysis based on the validation set. "BART in the RAG" (row 1) denotes the generator in the fully-trained RAG. The same retrieval is used in all cases. As in table 1, "S-BLEU" represents SacreBLEU.

5.1. Main Results

FIG. 4 is a table 1 showing the results we obtained for each data split, each including the seen and unseen settings. RAG (Lewis et al., 2020b) is the baseline adopted by the organizer, and we reproduced it with a more aggressive setting (e.g., a greater input length and beam size), in order to have a fair comparison with the proposed approach. Our generator is a single model. Table 1 shows that the proposed approach consistently outperformed the baseline with significant gaps. We believe that the following features contributed to the improvement: (1) high-quality retrieval, (2) stronger generator and (3) pipeline-based training. Effects of these features are discussed in the following sections.

5.2. Retrieval Results

Since the passage supervision of the development and test data is unavailable and the leaderboards do not provide the retrieval scores, we analyzed the passage retrieval performance on the validation set as shown in table 2 of FIG. 5. (We evaluated on a cleaned validation set where repeated queries are removed, resulting in 4181 unique instances (cf. 4201 originally) and 121 unique instances (cf. 121 originally) in the seen and unseen settings respectively.) The baseline adopts DPR (Karpukhin et al., 2020) as retriever, and we evaluated both the official and our reproduced versions.

Introducing the re-ranker gave marked improvement for all three pre-trained models, especially when applied to the unseen passages. In particular, RoBERTa achieved 53.5% and 126.6% improvement over the Reproduced DPR at R@1 on the seen and unseen settings respectively. The ensemble of different re-rankers brings further improvement—ε(B, E, R) exceeds the best single re-ranker by around 0.01 across all metrics on the seen data. Furthermore, improved retrieval directly enhances the final task results. Besides a more powerful generator, the large gap between RAG and our approach on the unseen Val data in table 1 may also be attributed to the significant performance gain on passage retrieval, from 0.248 to 0.62 on R@1.

5.3. Ablation Study on the Generator

FIG. 6 is a table 3, which shows that each component in our approach contributes to improvement. Passage dropout and regularization bring notable performance gains for the unseen setting. This demonstrates robustness in the generator, which is important in practical use.

To investigate the merits of pipeline training on generation, we separated the BART$_{large}$ generator from other parts in the reproduced RAG. We input queries combined with the passages returned by the re-ranker for inference. The first and second rows of table 3 show that the BART in the RAG gained some improvement through better retrieval, but remains inferior to the BART trained in a pipeline fashion. This is mainly attributed to the fact that under the end-to-end training framework of the RAG, the generator could receive some deteriorated query-passage pairs during training, if the retriever can not successfully return gold passages to the generator. Contrarily, pipeline training for the generator can make full use of training data.

6. Additional Embodiments

As shown in the foregoing example, a pipeline system of "retrieve, re-rank, and generate" can provide an effective approach to training an information-retrieval dialogue system. While a specific embodiment in the context of the MultiDoc2Dial challenge has been described, it should be understood that embodiments of the invention are not limited to any particular document set or task. Further, while specific models and parameters are identified, such identification is for purposes of illustration and should not be construed as limiting.

Embodiments described herein can be implemented in a variety of computer systems, including systems of conventional design as well as computer systems optimized for machine learning. Such systems can include processors (e.g., microprocessors), memory, and user interface components, examples of which are known in the art. In some embodiments, the system can include co-processors such as graphics processing units or neural-engine processors that may accelerate certain computations associated with machine learning operations.

Program code implementing various steps and operations described herein can be written in any suitable computer language, including compiler-based and/or scripting languages. Program code can be stored on various computer-readable storage media, such as optical disks, magnetic disks, solid-state memory devices (e.g., flash memory), and any other non-transitory medium.

Accordingly, although the invention has been described with respect to specific embodiments, it will be appreciated that the invention is intended to cover all modifications and equivalents within the scope of the following claims.

REFERENCES CITED

The foregoing description cites the following references. None is admitted to be prior art.

Danqi Chen, Adam Fisch, Jason Weston, and Antoine Bordes. 2017. Reading Wikipedia to answer open-domain questions. In *Proceedings of the 55th Annual Meeting of the Association for Computational Linguistics (Volume 1: Long Papers)*, pages 1870-1879, Vancouver, Canada. Association for Computational Linguistics.

Eunsol Choi, He He, Mohit Iyyer, Mark Yatskar, Wen-tau Yih, Yejin Choi, Percy Liang, and Luke Zettlemoyer. 2018. Quac: Question answering in context. In *Proceedings of the 2018 Conference on Empirical Methods in Natural Language Processing*, Brussels, Belgium, Oct. 31-Nov. 4, 2018, pages 2174-2184. Association for Computational Linguistics.

Kevin Clark, Minh-Thang Luong, Quoc V. Le, and Christopher D. Manning. 2020. Electra: Pre-training text encoders as discriminators rather than generators.

Jacob Devlin, Ming-Wei Chang, Kenton Lee, and Kristina Toutanova. 2019. BERT: Pre-training of deep bidirectional transformers for language understanding. In *Proceedings of the 2019 Conference of the North American Chapter of the Association for Computational Linguistics: Human Language Technologies, Volume 1 (Long and Short Papers)*, pages 4171-4186, Minneapolis, Minnesota Association for Computational Linguistics.

Thomas G. Dietterich. 2000. Ensemble methods in machine learning. In *Multiple Classifier Systems*, pages 1-15, Berlin, Heidelberg. Springer Berlin Heidelberg.

Song Feng, Siva Sankalp Patel, Hui Wan, and Sachindra Joshi. 2021. MultiDoc2Dial: Modeling dialogues grounded in multiple documents. In *Proceedings of the 2021 Conference on Empirical Methods in Natural Language Processing*, pages 6162-6176, Online and Punta Cana, Dominican Republic. Association for Computational Linguistics.

Song Feng, Hui Wan, R. Chulaka Gunasekara, Siva Sankalp Patel, Sachindra Joshi, and Luis A. Lastras. 2020. doc2dial: A goal-oriented document-grounded dialogue dataset. In *Proceedings of the 2020 Conference on Empirical Methods in Natural Language Processing, EMNLP 2020*, Online, Nov. 16-20, 2020, pages 8118-8128. Association for Computational Linguistics.

Luyu Gao, Zhuyun Dai, and Jamie Callan. 2021. Re-think training of BERT rerankers in multi-stage retrieval pipeline. In *Advances in Information Retrieval—43rd European Conference on IR Research, ECIR 2021, Virtual Event, Mar. 28-Apr. 1, 2021, Proceedings, Part II*, volume 12657 of *Lecture Notes in Computer Science*, pages 280-286. Springer.

Kelvin Guu, Kenton Lee, Zora Tung, Panupong Pasupat, and Ming-Wei Chang. 2020. REALM: retrieval-augmented language model pre-training. CoRR, abs/2002.08909.

Gautier Izacard and Edouard Grave. 2021. Leveraging passage retrieval with generative models for open domain question answering. In *Proceedings of the 16th Conference of the European Chapter of the Association for Computational Linguistics: Main Volume, EACL 2021*, Online, Apr. 19-23, 2021, pages 874-880. Association for Computational Linguistics.

Jeff Johnson, Matthijs Douze, and Hervé Jégou. 2017. Billion-scale similarity search with GPUs. *arXiv e-prints*, page arXiv:1702.08734.

Vladimir Karpukhin, Barlas Oguz, Sewon Min, Patrick Lewis, Ledell Wu, Sergey Edunov, Danqi Chen, and Wen-tau Yih. 2020. Dense passage retrieval for open-domain question answering. In *Proceedings of the 2020 Conference on Empirical Methods in Natural Language Processing (EMNLP)*, pages 6769-6781, Online. Association for Computational Linguistics.

Kenton Lee, Ming-Wei Chang, and Kristina Toutanova. 2019. Latent retrieval for weakly supervised open domain question answering. CoRR, abs/1906.00300.

Mike Lewis, Yinhan Liu, Naman Goyal, Marjan Ghazvininejad, Abdelrahman Mohamed, Omer Levy, Veselin Stoyanov, and Luke Zettlemoyer. 2020a. BART: denoising sequence-to-sequence pre-training for natural language generation, translation, and comprehension. In *Proceedings of the 58th Annual Meeting of the Association for Computational Linguistics, ACL 2020*, Online, Jul. 5-10, 2020, pages 7871-7880. Association for Computational Linguistics.

Patrick S. H. Lewis, Ethan Perez, Aleksandra Piktus, Fabio Petroni, Vladimir Karpukhin, Naman Goyal, Heinrich Küttler, Mike Lewis, Wen-tau Yih, Tim Rocktäschel, Sebastian Riedel, and Douwe Kiela. 2020b. Retrieval-augmented generation for knowledge-intensive NLP tasks. In *Advances in Neural Information Processing Systems 33: Annual Conference on Neural Information Processing Systems 2020, NeurIPS 2020*, Dec. 6-12, 2020, virtual.

Xiaobo Liang, Lijun Wu, Juntao Li, Yue Wang, Qi Meng, Tao Qin, Wei Chen, M. Zhang, and Tie-Yan Liu. 2021. R-drop: Regularized dropout for neural networks. In *Advances in Neural Information Processing Systems*.

Chin-Yew Lin. 2004. ROUGE: A package for automatic evaluation of summaries. In *Text Summarization Branches Out*, pages 74-81, Barcelona, Spain. Association for Computational Linguistics.

Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019. RoBERTa: A Robustly Optimized BERT Pretraining Approach. *arXiv e-prints*, page arXiv:1907.11692.

Matt Post. 2018. A call for clarity in reporting BLEU scores. In *Proceedings of the Third Conference on Machine Translation: Research Papers*, pages 186-191, Brussels, Belgium. Association for Computational Linguistics.

Pranav Rajpurkar, Jian Zhang, Konstantin Lopyrev, and Percy Liang. 2016. SQuAD: 100,000+ questions for machine comprehension of text. In *Proceedings of the 2016 Conference on Empirical Methods in Natural Language Processing*, pages 2383-2392, Austin, Texas. Association for Computational Linguistics.

Siva Reddy, Danqi Chen, and Christopher D. Manning. 2019. Coqa: A conversational question answering challenge. *Trans. Assoc. Comput. Linguistics*, 7:249-266.

Marzieh Saeidi, Max Bartolo, Patrick S. H. Lewis, Sameer Singh, Tim Rocktäschel, Mike Sheldon, Guillaume Bouchard, and Sebastian Riedel. 2018. Interpretation of natural language rules in conversational machine reading. In *Proceedings of the 2018 Conference on Empirical*

*Methods in Natural Language Processing*, Brussels, Belgium, Oct. 31-Nov. 4, 2018, pages 2087-2097. Association for Computational Linguistics.

Thomas Wolf, Lysandre Debut, Victor Sanh, Julien Chaumond, Clement Delangue, Anthony Moi, Pierric Cistac, Tim Rault, Rémi Louf, Morgan Funtowicz, and Jamie Brew. 2019. Huggingface's transformers: State-of-the-art natural language processing. *CoRR*, abs/1910.03771.

What is claimed is:

1. A computer-implemented method for responding to user queries, the method comprising:
obtaining a training set, the training set including a plurality of passages, a plurality of queries, and a plurality of responses, the training set further including association data associating particular queries of the plurality of queries with particular passages of the plurality of passages and particular responses of the plurality of responses;
performing a training process using the training set, wherein the training process includes:
training a retriever model to identify similarities between a query and a passage;
training a re-ranking model to rank a plurality of passages based on a distance metric defining a distance between a passage and a query, wherein the re-ranking model uses an ensemble of transformer language models that each output a distance function between a passage and a query, and wherein the re-ranking model ranks the plurality of passages based on a weighted sum of the distance functions of the transformer language models; and
training a generator model to generate a response to a query based on a passage; and
performing a testing process, wherein the testing process includes:
receiving a testing query;
using the retriever model to retrieve a plurality of passages responsive to the testing query;
using the re-ranking model to rank the retrieved passages based on the testing query; and
using the generator model to generate a response based on a highest-ranking one of the retrieved passages.

2. The method of claim 1 wherein the retriever model is a Dense Passage Retriever (DPR) model having a first encoder for a query and a second encoder for a passage.

3. The method of claim 2 wherein the retriever model defines similarity based on a dot product of an encoding of the query using the first encoder and an encoding of the passage using the second encoder.

4. The method of claim 1 wherein the ensemble of transformer language models includes at least three transformer language models.

5. The method of claim 1 wherein training the re-ranking model includes training one or more weights for the weighted sum.

6. The method of claim 1 wherein training the generator model includes training grounding span prediction as an auxiliary task.

7. The method of claim 1 wherein training the generator model includes applying passage dropout.

8. The method of claim 1 wherein each query in the training set includes a query history and wherein the testing query also includes a query history.

9. A system comprising:
a memory; and
a processor coupled to the memory and configured to:
obtain a training set, the training set including a plurality of passages, a plurality of queries, and a plurality of responses, the training set further including association data associating particular queries of the plurality of queries with particular passages of the plurality of passages and particular responses of the plurality of responses;
perform a training process using the training set, wherein performing the training process includes:
training a retriever model to identify similarities between a query and a passage;
training a re-ranking model to rank a plurality of passages based on a distance metric defining a distance between a passage and a query, wherein the re-ranking model uses an ensemble of transformer language models that each output a distance function between a passage and a query, and wherein the re-ranking model ranks the plurality of passages based on a weighted sum of the distance functions of the transformer language models; and
training a generator model to generate a response to a query based on a passage; and
perform a testing process, wherein the testing process includes:
receiving a testing query;
using the retriever model to retrieve a plurality of passages responsive to the testing query;
using the re-ranking model to rank the retrieved passages based on the testing query; and
using the generator model to generate a response based on a highest-ranking one of the retrieved passages.

10. The system of claim 9 wherein the retriever model is a Dense Passage Retriever (DPR) model having a first encoder for a query and a second encoder for a passage and wherein the retriever model defines similarity based on a dot product of an encoding of the query using the first encoder and an encoding of the passage using the second encoder.

11. The system of claim 10 wherein:
training the re-ranking model includes training one or more weights for the weighted sum.

12. The system of claim 9 wherein training the generator model includes training grounding span prediction as an auxiliary task.

13. The system of claim 9 wherein training the generator model includes applying passage dropout.

14. A non-transitory computer readable storage medium having stored therein program code instructions that, when executed by a processor of a computer system, cause the processor to perform a method comprising:
obtaining a training set, the training set including a plurality of passages, a plurality of queries, and a plurality of responses, the training set further including association data associating particular queries of the plurality of queries with particular passages of the plurality of passages and particular responses of the plurality of responses;
performing a training process using the training set, wherein the training process includes:
training a retriever model to identify similarities between a query and a passage;
training a re-ranking model to rank a plurality of passages based on a distance metric defining a distance between a passage and a query, wherein the re-ranking model uses an ensemble of transformer language models that each output a distance function between a passage and a query, and wherein the re-ranking model ranks the plurality of passages based on a weighted sum of the distance functions of the transformer language models; and training a generator model to generate a response to a query based on a passage; and performing a testing process, wherein the testing process includes:

receiving a testing query;

using the retriever model to retrieve a plurality of passages responsive to the testing query;

using the re-ranking model to rank the retrieved passages based on the testing query; and using the generator model to generate a response based on a highest-ranking one of the retrieved passages.

15. The computer readable storage medium of claim 14 wherein the retriever model is a Dense Passage Retriever (DPR) model having a first encoder for a query and a second encoder for a passage.

16. The computer readable storage medium of claim 15 wherein the retriever model defines similarity based on a dot product of an encoding of the query using the first encoder and an encoding of the passage using the second encoder.

17. The computer readable storage medium of claim 14 wherein the ensemble of transformer language models includes at least three transformer language models.

18. The computer readable storage medium of claim 14 wherein training the re-ranking model includes training one or more weights for the weighted sum.

19. The computer readable storage medium of claim 14 wherein training the generator model includes training grounding span prediction as an auxiliary task.

20. The computer readable storage medium of claim 14 wherein training the generator model includes applying passage dropout.

21. The computer readable storage medium of claim 14 wherein each query in the training set includes a query history and wherein the testing query also includes a query history.

\* \* \* \* \*